US012669700B2

(12) United States Patent
Winkler et al.

(10) Patent No.: US 12,669,700 B2
(45) Date of Patent: Jun. 30, 2026

(54) VEHICLE HEADLAMP

(71) Applicant: Docter Optics SE, Neustadt an der Orla (DE)

(72) Inventors: Markus Winkler, Neustadt an der Orla (DE); Hagen Schweitzer, Neustadt an der Orla (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 70 days.

(21) Appl. No.: 18/567,516

(22) PCT Filed: Dec. 14, 2022

(86) PCT No.: PCT/DE2022/100951
§ 371 (c)(1),
(2) Date: Dec. 6, 2023

(87) PCT Pub. No.: WO2023/134814
PCT Pub. Date: Jul. 20, 2023

(65) Prior Publication Data
US 2024/0272424 A1     Aug. 15, 2024

(30) Foreign Application Priority Data

Jan. 13, 2022     (DE) ..................... 10 2022 100 705.7

(51) Int. Cl.
*G02B 27/00*     (2006.01)
*F21S 41/153*     (2018.01)
(Continued)

(52) U.S. Cl.
CPC ........ *G02B 27/0006* (2013.01); *F21S 41/153* (2018.01); *F21S 41/275* (2018.01);
(Continued)

(58) Field of Classification Search
CPC ........ G02B 27/0006; G02B 9/36; G02B 9/60; F21S 41/153; F21S 41/275; F21S 41/255;
(Continued)

(56) References Cited

U.S. PATENT DOCUMENTS 6,130,777 A     10/2000 Yamashita et al.
6,152,590 A *   11/2000 Furst ....................... F21S 43/14
                                                    362/546
(Continued)

FOREIGN PATENT DOCUMENTS

CN     212841336 U     3/2021
DE     1099964 B     2/1961
(Continued)

OTHER PUBLICATIONS

International Preliminary Report on Patentability Issued on Jun. 20, 2024 in Corresponding PCT Application No. PCT/DE2022/100951.
(Continued)

*Primary Examiner* — William R Alexander
(74) *Attorney, Agent, or Firm* — Carter, DeLuca & Farrell LLP

(57) ABSTRACT

The disclosure relates, inter alia, to a motor vehicle (1) having a vehicle headlight (10) which comprises a lighting lens (46), the lighting lens (46) comprising a lens body (460) made of transparent material with at least one light entrance surface (462) and at least one light exit surface, wherein the lighting lens (46) further comprises a lighting assembly (461) which comprises a carrier (4612) on which is arranged a lighting matrix (4611) with a plurality of independently controllable lighting pixels, wherein by means of the lighting matrix (4611) light can be irradiated into the light entrance surface (462) of the lens body (460), which light exits from the light exit surface of the lens body (460), wherein between the lighting matrix (4611) and the light
(Continued)

1

10 entrance surface (462) an air gap (464) is provided which is sealed dust-tight but not air-tight with respect to the surroundings of the lighting lens (46).

23 Claims, 7 Drawing Sheets

(51) Int. Cl.
*F21S 41/275* (2018.01)
*F21V 5/00* (2018.01)
*F21V 31/00* (2006.01)
*F21W 102/155* (2018.01)
*F21Y 105/16* (2016.01)
*F21Y 115/10* (2016.01)

(52) U.S. Cl.
CPC ............ *F21V 5/008* (2013.01); *F21V 31/005* (2013.01); *F21W 2102/155* (2018.01); *F21Y 2105/16* (2016.08); *F21Y 2115/10* (2016.08)

(58) Field of Classification Search
CPC ......... F21S 41/295; F21S 45/33; F21V 5/008; F21V 31/005; F21W 2102/155; F21Y 2105/16; F21Y 2115/10
USPC ......................................................... 359/513
See application file for complete search history.

(56) References Cited

U.S. PATENT DOCUMENTS

| | | | |
|---|---|---|---|
| 6,347,880 B1 * | 2/2002 | Furst ................... | B60Q 1/2696 |
| | | | 362/545 |
| 6,616,313 B2 * | 9/2003 | Furst ..................... | B60Q 3/267 |
| | | | 362/546 |
| 7,139,133 B2 | 11/2006 | Bonitz et al. | |
| 10,914,443 B2 | 2/2021 | Kuhl et al. | |
| 2001/0033726 A1 | 10/2001 | Shie et al. | |
| 2002/0041498 A1 * | 4/2002 | Furst ................... | B60Q 1/2665 |
| | | | 362/494 |
| 2017/0234497 A1 | 8/2017 | Courcier et al. | |
| 2021/0278055 A1 | 9/2021 | Spinger et al. | |
| 2024/0011616 A1 * | 1/2024 | Winkler ................ | F21S 41/657 |

FOREIGN PATENT DOCUMENTS

| | | | |
|---|---|---|---|
| DE | 40 31 352 A1 | 4/1992 | |
| DE | 36 02 262 C2 | 5/1995 | |
| DE | 299 14 114 U1 | 11/1999 | |
| DE | 10 2005 009 556 A1 | 9/2005 | |
| DE | 102 26 471 B4 | 3/2007 | |
| DE | 10 2008 062 638 A1 | 9/2009 | |
| DE | 10 2011 114 636 A1 | 4/2013 | |
| DE | 10 2016 104 006 A1 | 9/2017 | |
| DE | 11 2018 000 084 A5 | 5/2019 | |
| EP | 3 546 822 A1 * | 10/2019 | ........... F21S 41/675 |
| JP | 2001147403 A | 5/2001 | |
| JP | 2009-159810 A | 7/2009 | |
| JP | 2010-123307 A | 6/2010 | |
| WO | 2009/109209 A1 | 9/2009 | |
| WO | 2013/068063 A1 | 5/2013 | |
| WO | 2015/031925 A1 | 3/2015 | |
| WO | 2019/072326 A1 | 4/2019 | |
| WO | 2021/008647 A1 | 1/2021 | |

OTHER PUBLICATIONS

International Search Report Issued in PCT/DE2022/100951 on Mar. 16, 2023.

Kvapil, et al., "Czochralski Growth of YAG:Ce in a Reducing Protective Atmosphere" Journal of Crystal Growth, 52, 1981, 542-545.

Choe, Jae Young, "Luminescence and compositional analysis of Y3Al5O12:Ce films fabricated by pulsed-laser deposition", Mat Res Innovat (2002) 6:238-241, DOI 10.1007/s10019-002-0204-4.

Zhou, Yonghui et al., "Synthesis-dependent luminescence properties of Y3Al5O12:Re3+ (Re=Ce, Sm, Tb) phosphors", Materials Letters 56 (2002) 628-636.

Rosario, G. Del et al., "Characterisation of YAG:Ce powders thermal treated at different temperatures", Applied Surface Science 238 (2004) 469-474.

Cavouras, D. et al., "Light emission efficiency and imaging performance of Y3Al5O12: Ce (YAG: Ce) powder screens under diagnostic radiology conditions", Appl. Phys. B 80, 923-933 (2005), DOI: 10.1007/s00340-005-1791-8.

Audi—Vorsprung durch Technik, The Wayback Machine—https://web.archive.org/web/20150109234745/http://www.audi.de/content/de/brand/de/vorsprung_durch_technik/content/2013/08/Audi-A8-erstrahl . . . Jun. 28, 2022.

Considerations for Encapsulant Material Selection for Phosphor-Converted LEDs , Dec. 16, 2011, pp. 1-8.

LED im Fahrzeug: Die Rolle der Matrixscheinwerfer und was sie leisten, https://www.next-mobility.de/led-im-fahrzeug-die-rolle-der-matrixscheinwerfer-und-was-sie-leisten-a-756004/ , pp. 1-5 Jun. 28, 2022.

Matrix-LED- und Laserlicht bietet viele Vorteile, https://www.all-electronics.de/automotive-transportation/matrix-led-und-laserlicht-bietet-viele-vorteile.html , pp. 1-12 Jun. 28, 2022.

* cited by examiner

VEHICLE HEADLAMP

FIELD OF THE DISCLOSURE

The disclosure relates to a motor vehicle with a vehicle headlight. The disclosure also relates to a vehicle headlight, for example a motor vehicle headlight, and to a method for manufacturing a vehicle headlight. A vehicle headlight within the meaning of the present disclosure relates for example to so-called matrix light or adaptive high beam. The disclosure also relates to a lighting lens having a lens body and a lighting means or a lighting matrix.

BACKGROUND

Examples of matrix light or adaptive high beam can be found at web.archive.org/web/20150109234745/http://www.audi.de/content/de/brand/de/vorsprung_durch_tech-nik/content/2013/08/Audi-A8-erstrahlt-in-neuem-Licht.h-tml (accessed Sep. 5, 2019), www.all-electronics.de/matrix-led-und-laserlicht-bietet-vielevorteile/(accessed Sep. 2, 2019), and www.next-mobility.news/led-im-fahrzeug-die-rolleder-matrixscheinwerfer-und-was-sie-leisten-a-756004/ (accessed Sep. 2, 2019). It is proposed to use a segmented light source in conjunction with an objective to implement matrix light or adaptive high beam. The objective has the task to image the segmented light source (e.g. LED pixel approx. 50 µm×50 µm) on the road, so that on the one hand an illumination task (e.g. bright-dark-boundary) and on the other hand an information task (projection of symbols) can be fulfilled. Since the requirements on the accuracies are very high, a high accuracy must also be achieved in the mounting of the light source relative to the objective. This can be solved by adjustable mounting (alignment). During these assembly processes and also during subsequent operation of the vehicle headlight, there is still a risk of contamination of the installation space between the light entrance lens of the lens and the light source or the light source and/or the lens. Given the small size of the light source, contamination can lead to imaging errors or reduced illumination performance. This results in increased requirements for cleanliness during headlight assembly and also for the components used in the headlight, leading to an increase in the effort and cost of implementing matrix lighting or adaptive high beam.

SUMMARY

The present disclosure relates to a motor vehicle with a vehicle headlight, a vehicle headlight or a method according to the claims. Thereby, for example a lighting lens for a headlight, for example for a motor vehicle headlight, is proposed, the lighting lens comprising a lens body of transparent material having at least one light entrance surface and at least one light exit surface, the lighting lens furthermore having a lighting assembly which comprises a carrier on which an lighting matrix with a plurality of independently controllable lighting pixels is arranged, wherein by means of the lighting matrix light can be irradiated into the light entrance surface of the lighting lens, which light emerges from the light exit surface of the lens body, wherein between the lighting matrix and the light entrance surface an air gap is provided which is sealed dust-tight but not air-tight with respect to the environment of the lighting lens.

DETAILED DESCRIPTION

Figure 1:
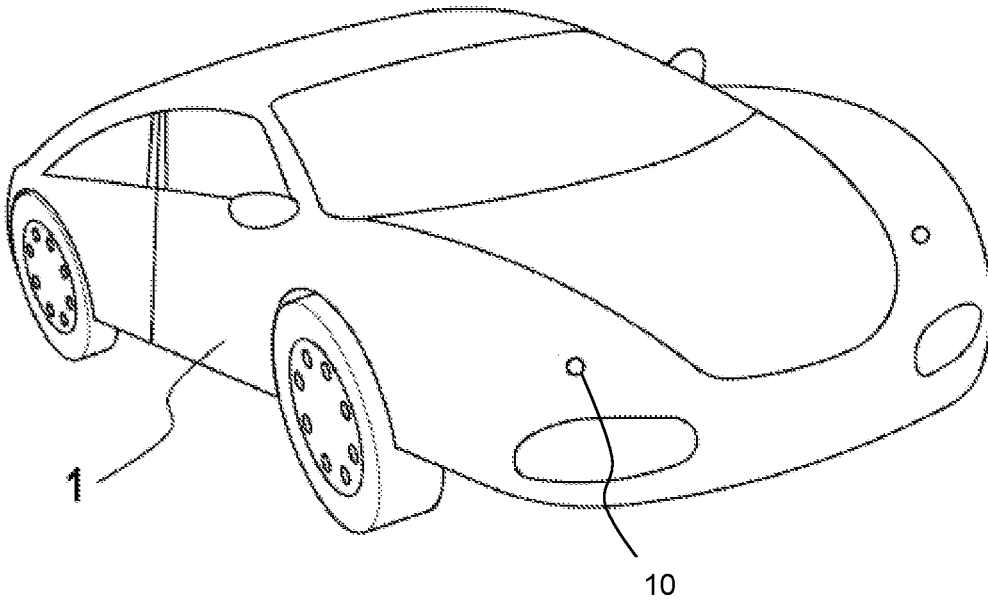
FIG. 1 shows an embodiment example of a motor vehicle with a vehicle headlight.

The disclosure relates, inter alia, to a motor vehicle having a vehicle headlight which comprises a lighting lens, the lighting lens comprising a lens body made of transparent material with at least one light entrance surface and at least one light exit surface, wherein the lighting lens further comprises a lighting assembly which comprises a carrier on which is arranged a lighting matrix with a plurality of independently controllable lighting pixels, wherein by means of the lighting matrix light can be irradiated into the light entrance surface of the lens body, which light exits from the light exit surface of the lens body, wherein between the lighting matrix and the light entrance surface an air gap is provided which is sealed dust-tight but not air-tight with respect to the surroundings of the lighting lens.

For example, it is provided that the air gap is connected to the ambient air surrounding the lighting lens only via a particle filter. In this case, the particle filter allows air to pass through, but not dust particles. A corresponding filter can be a membrane, for example. Thus, it can be provided that the air gap is sealed dust-tight but not air-tight against the environment of the lighting lens by means of a membrane.

In an embodiment, the lighting matrix comprises a plurality of independently controllable lighting pixels, for example not less than 10,000, for example not less than 1,000,000, of independently controllable lighting pixels.

In an embodiment, the lens body of the lighting lens consists, for example substantially, of glass or inorganic glass. It may be provided that at least the light entrance surface of the lens body is designed to be light-reflecting.

The disclosure further relates to a vehicle headlight with an aforementioned lighting lens.

In a further embodiment, the lens body together with at least one first objective lens or with a first objective lens and at least one second objective lens forms an objective lens for imaging light emitted by means of the lighting matrix.

In a further embodiment, the first objective lens has a light exit surface that forms the light exit surface of the objective lens.

In a further embodiment, the first objective lens comprises a first light entrance surface and a first light exit surface. In a further embodiment, the second objective lens comprises a second light entrance surface and a second light exit surface. In a further embodiment, the first light entrance surface is configured as a planar surface. In a further embodiment, the first light exit surface is configured as a convex curved surface. In a further embodiment, the second light entrance surface is configured as a convexly curved surface. In a further embodiment, the second light exit surface is configured as a planar surface. In a further embodiment, the first light entrance surface is configured as a ground flat surface. In a further embodiment, the first light exit surface is configured as a press-molded convex curved surface. In a further embodiment, the second light entrance surface is configured as a press-molded convex curved surface. In a further embodiment, the second light exit surface is configured as a ground flat surface. In a further embodiment, the first light entrance surface and the second light exit surface face each other.

The disclosure further relates to a motor vehicle with an aforementioned vehicle headlight.

In a further embodiment, the motor vehicle comprises ambient sensor technology for detecting the environment in front of the motor vehicle, the ambient sensor technology being connected to the vehicle headlight in terms of data technology in such a way that the light distribution emitted by means of the vehicle headlight is dependent on the output signals of the ambient sensor technology.

The disclosure also concerns a method for producing a vehicle headlight as mentioned above, wherein a lens body is formed from transparent material with at least one light entrance surface and at least one light exit surface, example press-molded, for example on both sides, wherein a lighting matrix with a plurality of lighting pixels which can be driven independently of one another is arranged on a carrier, wherein the carrier is connected to the lens body in such a way to form an lighting lens, that light generated by means of the lighting matrix can be irradiated into the light entrance surface of the lens body via an air gap between the lighting matrix and the light entrance surface of the lens body, wherein the air gap is sealed dust-tight but not air-tight with respect to the surroundings of the lighting lens, wherein thereafter the lighting lens is installed or provisionally installed with at least one objective lens aligned with one another with respect to a lighting module and/or a vehicle headlight in such a way that the lens body and the objective lens form an objective for imaging light of the lighting matrix.

A vehicle headlight within the meaning of this disclosure is for example a so-called adaptive high beam or matrix light. An anti-reflective design or an anti-reflective layer within the meaning of this disclosure is for example an anti-reflection coating.

For the purposes of this disclosure, press-molding is to be understood for example as pressing a (for example optically effective) surface in such a way that subsequent finishing of the contour of this (for example optically effective) surface can be omitted or is omitted or is not provided. It is thus intended for example that a press-molded surface is not ground after the press-molding. Polishing, which does not affect the surface finish but the contour of the surface, may be provided. For example, the press-molding is carried out in accordance with a process as described in WO 2021/008647 A1. The process described in WO 2021/008647 A1 permits particularly precise press-molding.

A (light emitting) pixel in the sense of this disclosure is for example a separately controllable area. A (light emitting) pixel in the sense of this disclosure is for example the smallest unit of a separately controllable area. A (light emitting) pixel in the sense of this disclosure has for example an extension (diagonal or side length) of at least 20 $\mu$m, for example at least 40 $\mu$m, for example at least 50 $\mu$m. A (light emitting) pixel in the sense of this disclosure has for example an extension (diagonal or side length) of not more than 200 $\mu$m, for example not more than 100 $\mu$m, for example not more than 50 $\mu$m.

A lighting matrix in the sense of this disclosure is for example an LED matrix or an OLED matrix. A lighting assembly in the sense of this disclosure is for example a blue light emitting LED matrix or OLED matrix. In addition, a luminous fabric (English: phosphor) may be provided which emits white light when excited by the blue light of the LED or OLED. This phosphor is arranged, for example, between the LED or OLED and the anti-reflective layer. Details on phosphors for generating white light by irradiation with— e.g. blue light—can be found in WO 2013 068063 A1 as well as in the literature cited therein www.phosphor-technology.com/faq.htm, J. Y. Choe, Mat Res Innovat 6:238-241, 2002, (2002 Luminescence and compositional analysis of YAG_Ce films fabricated by pulsed-laser deposition.pdf), G. Del Rosario et al, Applied Surface Science 238, 469-474, 2004, (2004 Characterisation of YAG_Ce powders thermally treated at different temperatures.pdf), Y. Zhou et al, Materials Letters 56, 628-636, 2002, (2002 Synthesis-dependent luminescence properties of YAG_Ce phosphors.pdf), J. Kvapil et al, Journal of Crystal Growth 52, 542-545, 1981, (1981 Czochralski growth of YAG_Ce in a reducing protective atmosphere.pdf), D. Cavouras et al, Appl. Phys. B 80, 923-933, 2005, (2005 Light emission efficiency and imaging performance of YAG Ce powder screens.pdf), Intematix product information: (IntematixApp-Note-Encapsulant-Selection.pdf).

In one embodiment, the lens body consists of (essentially) glass or inorganic glass. Inorganic glass or glass in the sense of this disclosure is for example silicate glass. Glass (or inorganic glass) within the meaning of this disclosure is for example glass as described in WO 2009/109209 A1. Glass within the meaning of this disclosure comprises for example 0.2 to 2 wt.-% $Al_2O_3$,
0.1 to 1 wt.-% $Li_2O$,
0.3, for example 0.4, to 1.5 wt.-% $Sb_2O_3$,
60 to 75 wt.-% $SiO_2$,
3 to 12 wt.-% $Na_2O$,
3 to 12 wt.-% $K_2O$ and
3 to 12 wt.-% CaO,
such as DOCTAN®.

In one embodiment, the second objective lens consists of (essentially) plastic. For example, it may be provided that a plastic lens is arranged between two glass lenses.

An edge or a lens edge in the sense of this disclosure is for example three-dimensional. An edge or a lens edge in the sense of this disclosure has for example a volume. An edge or a lens edge in the sense of this disclosure comprises for example a support shoulder in the direction of the curved surface. It may be provided that the support shoulder is used as a reference or reference surface when grinding the flat surface.

For example, it is provided that the support shoulder is in a fixed relationship to the press-molded surface.

It may be provided that one or more of the (optical or optically effective) surfaces of the objective lenses and/or the lens body, for example the planar or convexly curved optically effective surfaces, have a light-diffracting structure. The light-diffracting structure may be limited to a part of the surface, for example a central part of the surface. For example, it is provided that the light diffracting structure serves for chromatic correction. That means for example that color fringes are suppressed and/or reduced by means of the light-diffracting structure. Deterministic surface structures, such as those disclosed for example in WO 2015/031925 A1, and deterministic non-periodic surface structures, such as those disclosed for example in DE 10 2011 114 636 A1, can be used. Another suitable surface structure is disclosed for example by DE 11 2018 000 084 A5. Surface structures can be created by molding. A suitable light-scattering surface structure comprises, for example, a modulation and/or a (surface) roughness of at least 0.05 μm, for example at least 0.08μ, or is designed as a modulation optionally with an additional (surface) roughness of at least 0.05 μm, for example at least 0.08μ. Roughness in the sense of the disclosure is to be defined for example as Ra, for example according to ISO 4287. In a further embodiment, the light-scattering surface structure may comprise a structure mimicking a golf ball surface or be configured as a structure mimicking a golf ball surface. Suitable light scattering surface structures are disclosed, for example, in DE 10 2005 009 556 A1, DE 102 26 471 B4 and DE 299 14 114 U1. Further embodiments of light-scattering surface structures are disclosed in German patent specification 1 099 964, DE 36 02 262 C2, DE 40 31 352 A1, U.S. Pat. No. 6,130,777 A, US 2001/0033726 A1, JP 10123307 A, JP 09159810 A, and JP 01147403 A.

The light entrance surface (of the lens body), the light exit surface (of the lens body), the first light entrance surface, the second light entrance surface, the first light exit surface and the second light exit surface in the sense of the claims or in the aforementioned sense or context are for example optically effective surfaces. An optically effective surface in the sense of the present disclosure is for example a surface in the intended light path of the headlight or the vehicle headlight or the lighting module.

In one embodiment, the lens body, the first objective lens and/or the second objective lens have a light absorbing shell surface. In one embodiment, there is a distance—along the optical axis (of the objective lens)—between the light entrance surface of the lens body or the lighting matrix and the light exit surface of the lens body, the distance being not less than the focal length of the light exit surface of the lens body and/or not greater than twice the focal length of the light exit surface of the lens body.

In one embodiment, a motor vehicle comprises an aforementioned vehicle headlight. In one embodiment, the motor vehicle comprises environment sensor technology for detecting the environment in front of the motor vehicle, the environment sensor technology being connected in terms of data technology to the vehicle headlight in such a way that the light distribution emitted by means of the vehicle headlight is dependent on the output signals of the environment sensor technology. Ambient sensor technology within the meaning of this disclosure is, for example, sensor technology for detecting driving situations, such as those described in FIGS. 3 and 4. The disclosure also relates to a method of manufacturing a motor vehicle, in which the vehicle headlight is integrated into the motor vehicle for illuminating an area in front of the motor vehicle.

The disclosure also relates to a method for producing a lighting assembly or a vehicle headlight, for example a lighting assembly or of a vehicle headlight having one or more of the aforementioned features, wherein a first lens and at least one second lens are provided and/or produced, it being provided for example that the first lens has or is provided with a first (for example optically effective) surface having an anti-reflective layer, the lighting assembly being arranged on the first (for example optically effective) surface wherein the first lens with the lighting direction and the second lens are combined to form an objective by means of which a test image is generated, wherein the first lens and the second lens are adjusted relative to one another as a function of the test image, for example until the test image corresponds (at least within a permissible tolerance range) to a target image. The generation of a test image takes place for example by projection onto a reference surface. In this process, the lighting device or light emitted by means of the lighting device is projected onto a reference surface by means of the objective. The comparison between the test image and the target image can be performed, for example, by projecting the test image directly onto the target image.

The lighting device used to generate the test image is thus the same lighting device that the vehicle headlight has (in subsequent operation).

An antireflective layer within the meaning of the present disclosure is, for example, a layer which is configured in such a way that it has an anti-reflective effect on the light emitted by the lighting device.

A test image in the sense of this disclosure can for example comprise a sequence and/or a group of partial test images. The individual partial test images differ from each other for example in that, at least in part, different pixels emit light (or are controlled accordingly). For example, it is provided that for each partial test image there is a partial target image with which the partial test image is or can be compared.

Motor vehicle in the sense of the disclosure is for example a land vehicle which can be used individually in road traffic. Motor vehicles within the meaning of the disclosure are for example not limited to land vehicles with internal combustion engines.

DETAILED DESCRIPTION OF THE DRAWINGS

Figure 2:
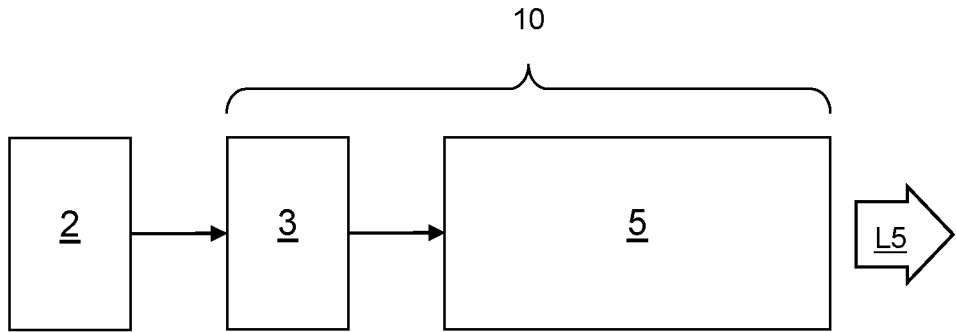
FIG. 2 shows an embodiment example of a vehicle headlight according to FIG. 1 in principle representation.
Figure 3:
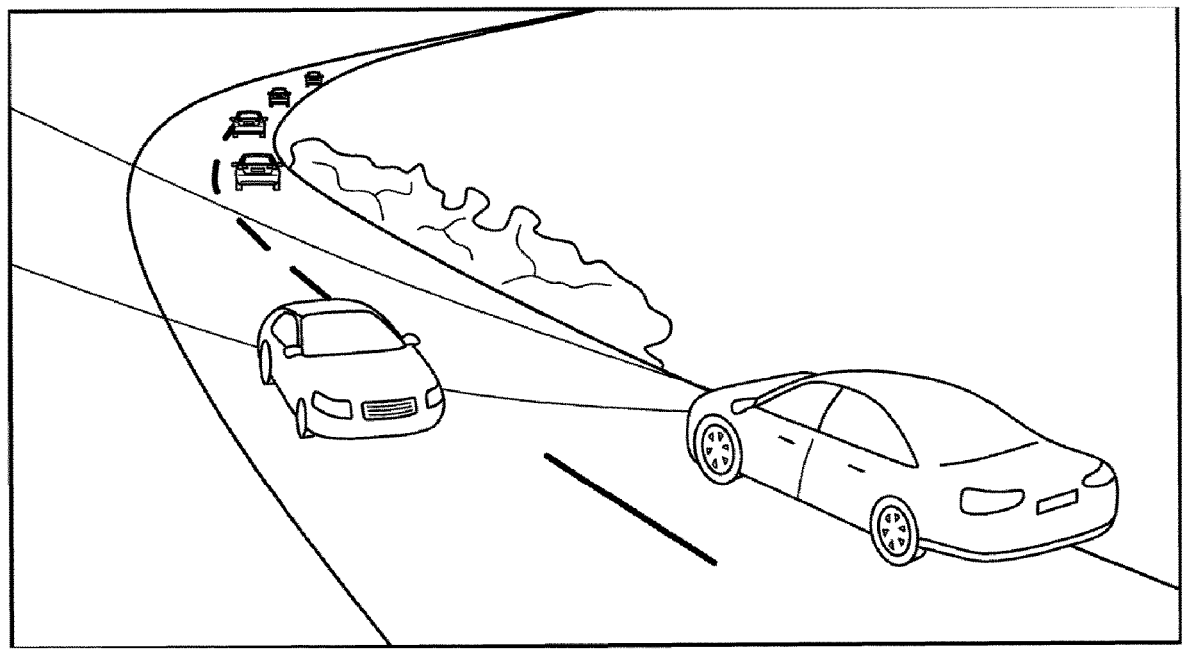
FIG. 3 shows an embodiment example of matrix light or adaptive high beam.

FIG. 1 shows a motor vehicle 1 with an adaptive headlight or vehicle headlight 10, shown in more detail in FIG. 2, for situation dependent or traffic dependent illumination of the surroundings or the road ahead of the motor vehicle 1 as a function of environment sensor technology 2. For this purpose, the vehicle headlight 10 has a lighting module 5, shown in more detail in FIG. 5 with a lighting assembly 534, which is controlled by means of a control 3 of the vehicle headlight 10 (in conjunction with an objective 50 shown in FIG. 5) for generating a situation-dependent illumination pattern L5 (for situation-dependent illumination of the surroundings of the motor vehicle 1 or the area/environment in front of the motor vehicle 1). Examples of corresponding illumination patterns are shown in FIG. 3 and FIG. 4, where FIG. 3 is taken from web.archive.org/web/20150109234745/http://www.au-
di.de/content/de/brand/de/vorsprung_durch_technik/ content/2013/08/Audi-A8-erstrahltin-neuem-Licht.h-
tml (accessed Sep. 5, 2019)
and FIG. 4 is taken from
www.all-electronics.de/matrix-led-und-laserlicht-bietet-
viele-vorteile/(accessed Sep. 2, 2019).

Figure 4:
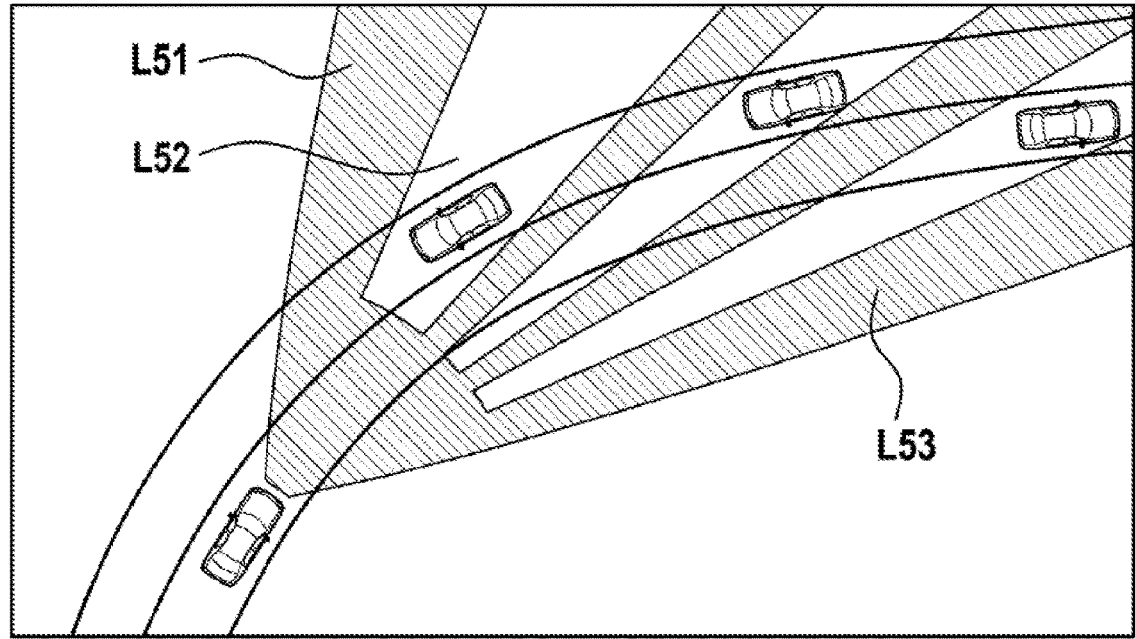
FIG. 4 shows another embodiment example of matrix light or adaptive high beam.

In the embodiment according to FIG. 4, the lighting pattern L5 comprises at least one dazzled area L51, at least one dimmed area L52 and curve light L53.

Figure 5:
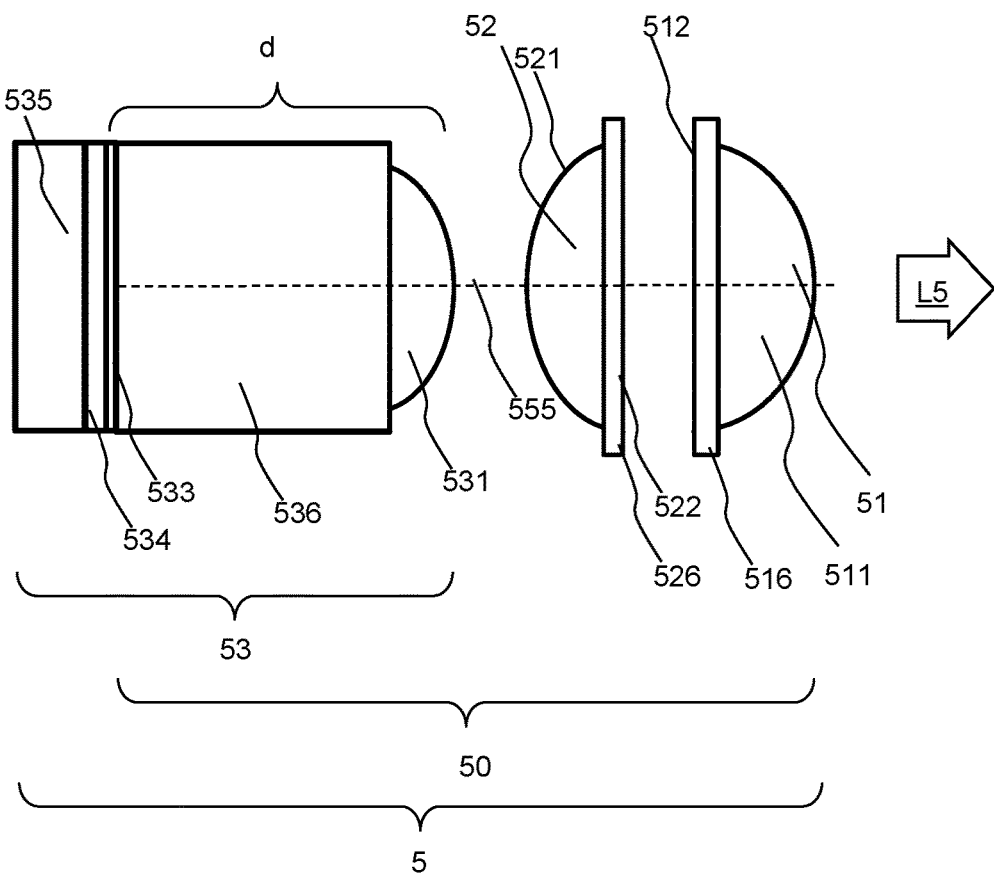
FIG. 5 shows an embodiment example of a lighting module of a vehicle headlight according to FIG. 2.

The (segmented) lighting device 534 according to FIG. 5 comprises a plurality of individually adjustable areas or pixels. For example, 10,000 pixels or more may be provided, which are individually controllable by means of the control 3 in the sense that they can be individually switched on or off, for example. The vehicle headlight 10 or the lighting module 5 further comprises an objective 50 for imaging (light) from the lighting device 534 or light emitted by the lighting device 534. In one embodiment example, the objective 50 comprises an objective lens 51 having a press-molded (optically effective) convex curved surface 511, having a ground planar surface 512 opposite the press-molded convex curved surface 511, and having an integrally formed lens edge 516. In the embodiment example, the objective 50 further comprises an objective lens 52 having a press-molded (optically effective) convex curved surface 521, having a ground planar surface 522 opposite the press-molded convex curved surface 521, and having an integrally formed lens edge 526. In an alternative embodiment, the objective lens 52 may be made, for example, of plastic, for example plastic having approximately the same refractive index as the glass of the glass lenses of the objective lens 50, by an injection molding process.

The objective 50 further comprises a lens body 536 having a convexly curved optically effective surface 531. The lens body 536, together with an antireflection coating 533, an LED matrix as implementation of a (segmented) light source or lighting device 534 (hereinafter also referred to as lighting matrix), and a heat sink 535 for the lighting device 534 configured as LED matrix, forms part of a lighting lens 53. In an exemplary embodiment, the distance d along the optical axis 555 of the lighting lens 53 or the lens body 536 or the objective 50 is greater than the focal length of the convexly curved optically effective surface 531 of the lighting lens 53 and less than twice the focal length of the convexly curved optically effective surface 531 of the lighting lens 53. It may be provided that the heat sink 535 is part of the lighting module 5, but not part of the lighting lens 53.

Figure 6:
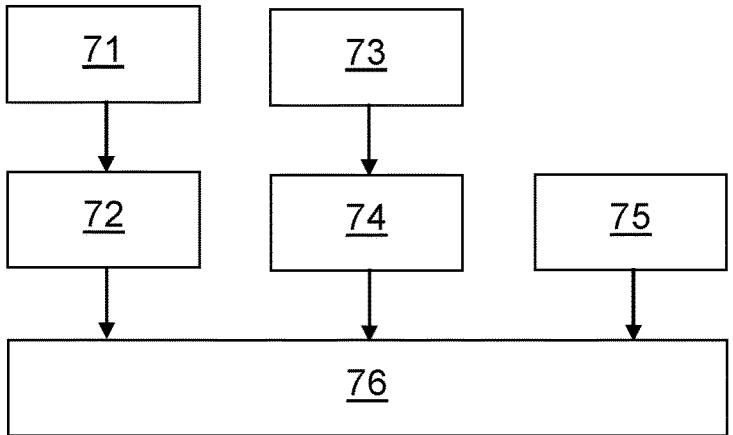
FIG. 6 shows an embodiment example of a process for manufacturing a vehicle headlight according to FIG. 2.
Figure 7:
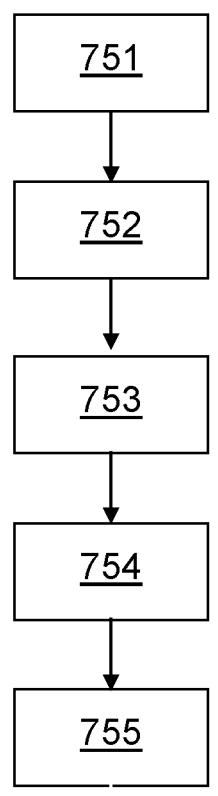
FIG. 7 shows an embodiment example of a process for producing an lighting lens for a lighting module according to FIG. 5 or for a vehicle headlight according to FIG. 2.
Figure 8:
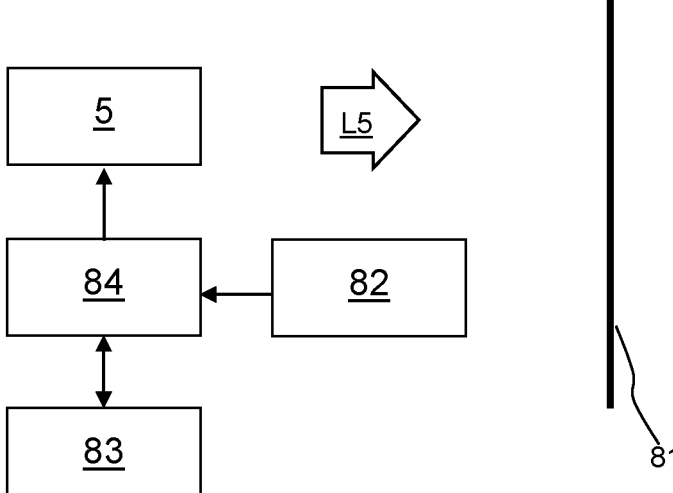
FIG. 8 shows an embodiment example of a method for adjusting a lighting module according to FIG. 5 or a vehicle headlight according to FIG. 2

FIG. 6 shows, in conjunction with FIGS. 7 and 8, an embodiment example for the manufacturing of the objective lens 5. In this case, the objective lens 51 is first pressmolded on both sides in a step 71 as provided, for example, in accordance with the method of WO 2019/072326 A1 or WO 2021/008647 A1. Subsequently, the planar side is ground in a step 72 so that the surface/planar area 512 is obtained/provided. Accordingly, the headlight lens 52 is manufactured, wherein step 73 is analogous to step 71 and step 74 is analogous to step 72.

In addition, in a step 75, the lighting lens 53 is manufactured by means of a method such as that described in FIG. 7. In this process, first, in a step 751, the lens body 536 having a convexly curved optically effective surface 531 of inorganic glass is pressed or blank-pressed. A surface of the lens body 536 opposite to the surface 531 is ground flat in a step 752 and then provided with an antireflection coating 533 (also referred to as an antireflective layer) or surface-treated to implement an anti-reflection coating in a step 753. In a subsequent step 754, a lighting device 534 configured as an LED matrix with, for example, 10,000 pixels that can be controlled independently of one another is arranged. The LED matrix is an embodiment example for a lighting device in the sense of the claims. In a subsequent step 755 or a step 755 preceding step 754 or in the course of step 76, the lighting device 354 configured as an LED matrix is provided with the heat sink 535 on its rear side. The steps 72, 74 and 75 according to FIG. 6 are followed by step 76, in which the objective lens 51, the objective lens 52 and lighting lens 53 are installed and adjusted in the lighting module 5. In addition, the lighting module 5, and the control unit 3 are integrated into the vehicle headlight 10 in a housing not shown in greater detail.

To adjust the lighting module 5, a test image is projected by means of the lighting module 5 or by means of the objective 50 onto a reference surface 81 as shown in FIG. 8. The pattern for controlling the lighting module 5 can be stored together with a corresponding target image in a database 83 and can be read out by a test module 84. The test module 84 controls the lighting module 5 accordingly. A camera 82 may be provided which records the test image and feeds its corresponding output signal to the test module 84. The test module 84 compares the test image and the target image. Instead of the camera 82 and the corresponding sub-functionality of the inspection module 84, an operator may also perform the matching. The objective lens 51, the objective lens 52 and the lighting lens 53 are adjusted in relation to each other as a function of the test image until the test image corresponds (at least within a permissible tolerance range) to the corresponding target image.

Contamination of the lighting matrix or LED or light source or lighting device during installation in the headlight/vehicle headlight is avoided by integrating the light source/lighting device in the objective during manufacture of the headlight/vehicle headlight. By integrating the light source/lighting device into the lens, the installation space between the lighting matrix or LED or light source or lighting device and the transparent lens body is closed and cannot be subsequently contaminated. When assembling the objective, the same assembly technique can be used for adjusting the lighting matrix or LED or light source or lighting device. Furthermore, testing of the assembly of the lenses of the objective as well as the entire assembly can always be performed with the same lighting matrix or LED or light source or lighting device. The disclosure makes it possible, for example, to detect errors in the light color at an early stage.

Figure 9:
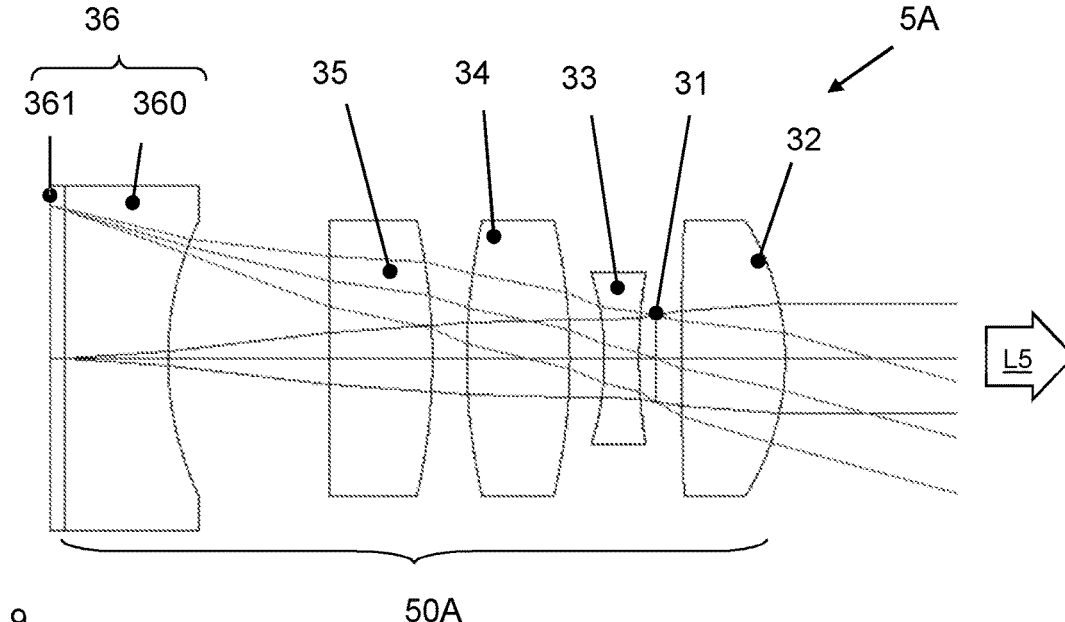
FIG. 9 shows an embodiment example of a lighting module with an alternative design to the lighting module shown in FIG. 5.

FIG. 9 shows an alternative embodiment of a lighting module 5A (with an objective 50A) for use in place of the lighting module 5. The lighting module 5A has an objective lens 32 on the light exit side. An objective lens 33 is arranged behind the objective lens 32 as viewed from the light exit side. An aperture is arranged between the objective lens 32 and the objective lens 33, the opening of which is designated by reference numeral 31. An objective lens 34 is arranged behind the objective lens 33. An objective lens 35 is arranged behind the objective lens 34, and a lighting lens 36 is arranged behind the objective lens 35, which comprises a lens body 360 and a lighting assembly 361 on the side of the lens body 360 facing away from the light exit direction. At this point, the lighting assembly 361 is synonymous with, for example, a lighting assembly corresponding to the lighting assembly 534 and a heat sink corresponding to, for example, the heat sink 535. In addition, the lens body 360 may have an antireflection coating corresponding to the antireflection coating 533 shown in FIG. 5.

Figure 10:
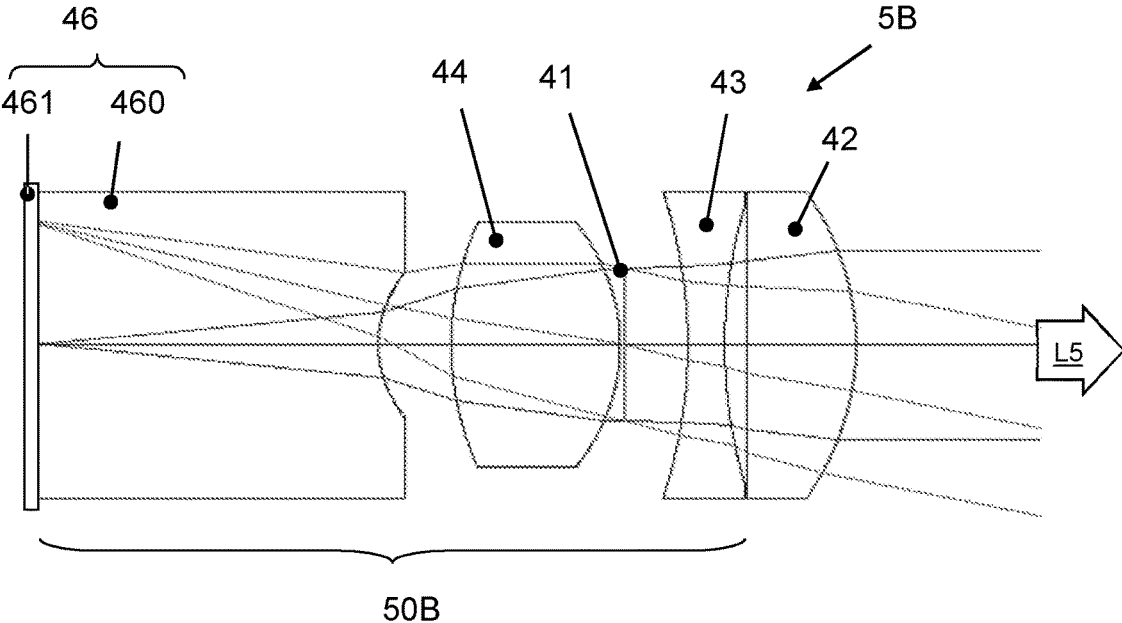
FIG. 10 shows an embodiment example of a further alternative lighting module for use instead of the lighting module according to FIG. 5 or the lighting module according to FIG. 9.

FIG. 10 shows an alternative embodiment example for a lighting module 5B for use instead of the lighting module 5 or instead of the lighting module 5A. The lighting module 5B has a light exit side objective lens 42. An objective lens 43 is arranged behind the objective lens 42 as viewed from the light exit side. An objective lens 44 is arranged behind the objective lens 43. An aperture is arranged between the objective lens 43 and the objective lens 44, the opening of which is designated by reference sign 41. A lighting lens 46 is arranged behind the objective lens 44, which comprises a lens body 460 and a lighting assembly 461 on the side of the lens body 460 facing away from the light exit direction. At this point, the lighting assembly 461 is synonymous with, for example, an lighting device corresponding to the lighting device 534 and a heat sink corresponding to, for example, the heat sink 535. In addition, the lens body 460 may have an antireflection coating corresponding to the antireflection coating 533 shown in FIG. 5.

Figures 11, 12:
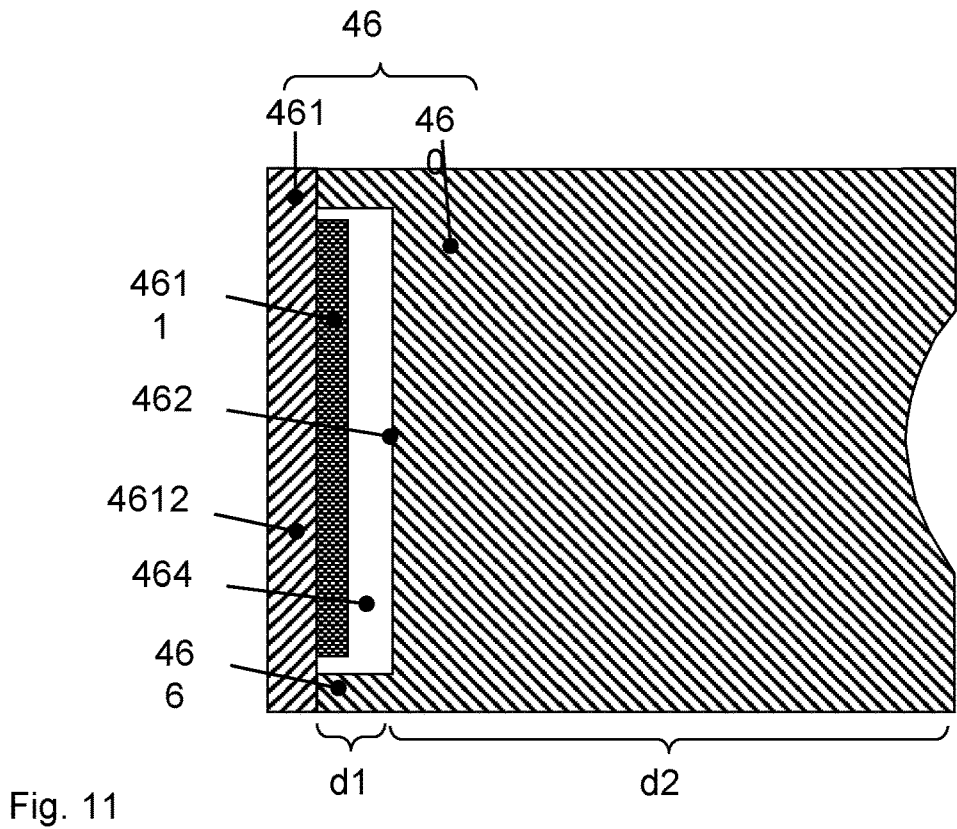
FIG. 11 shows a cross-sectional view of a lighting lens for use with a lighting module according to FIG. 10, a lighting module according to FIG. 9, and a modification of the lighting module according to FIG. 5.
FIG. 12 shows an external view of the lighting lens according to FIG. 11.

In an alternative embodiment, it is provided that the lighting device or a lighting matrix (of a lighting assembly 361) is not directly connected to the lens body 360, 460 or 536, but is arranged spaced apart with a small distance (air gap). A possible embodiment example is shown in FIG. 11 in modification to the embodiment example of a lighting module 5B according to FIG. 10 representative of corresponding variations of the lighting modules 5 or 5A. Here, the lighting lens 46 has a lighting assembly 461 and a lens body 460 with a projecting lens edge 466. For example, it is provided that the lens body 460 is press-molded. For example, it may be provided that the distance d1 along an optical axis corresponding to the optical axis 555 of FIG. 5, which denotes the extension of the lens edge 466 of the lens body 460, is not subject to tolerance with respect to variations of a blank that is press-molded to obtain the lens body 460. Volume variations of a corresponding blank for press-molding the lens body 460 are provided as a tolerance or variation in the distance d2. Further, the lighting assembly 461 may include a carrier 4612 on which the lighting matrix 4611 is arranged. In this regard, the lighting matrix 4611 has been fabricated on the carrier 4612. Subsequently, the carrier 4612 is connected to the protruding edge 466 of the lens body 460, e.g. glued. Thereby, a small air gap 464 is provided between the carrier 4612 or the lighting matrix 4611 and the light entrance surface 462 of the lens body 460. The size of the air gap 464 corresponds essentially to the distance d1 reduced by the extent of the lighting matrix 4611.

FIG. 12 shows the lighting lens 46 in a side view. Here, reference numeral 468 denotes a recess in the lens edge 466. A dust filter element 469 is arranged in this recess, which allows gas exchange between the air gap 464 and the surroundings of the lighting lens 46, but does not allow dust particles to enter the air gap 464. A corresponding filter may be, for example, a membrane or a ceramic filter.

Figure 13:
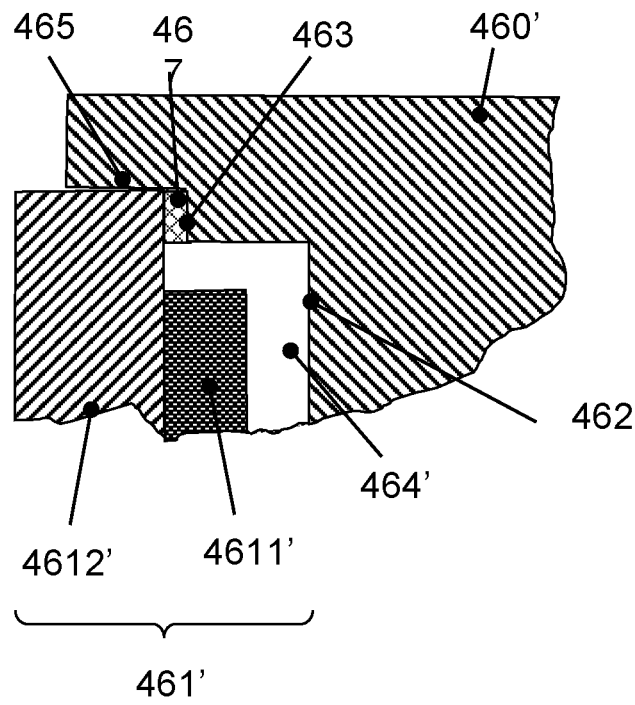
FIG. 13 shows a modification of the lighting lens according to FIG. 11.

FIG. 13 shows a modified embodiment of a lighting lens 46' for replacing the lighting lens 46 according to FIG. 11 and FIG. 12. Here, a carrier 4612' is provided on which a lighting matrix 4611' is arranged. The carrier 4612' and the lighting matrix 4611' together form a lighting assembly 461'. In a modification to the embodiment according to FIG. 11, a lens body 460' has a lens edge 466' that is modified from the lens edge 466 of the lens body 460 in that it has a step in the interior formed by a support shoulder 463 and a centering surface 465. A seal 467 is provided on the support shoulder 463, on which the carrier 4612' rests on the support shoulder 463. An air gap 464' is provided between the light entrance surface of the lens body 460', designated by reference numeral 462', and the lighting matrix 4611'. This air gap 464' has a recess corresponding to the recess 469 according to FIG. 12, which is sealed by means of a dust filter element corresponding to the dust filter element 496 according to FIG. 12.

Figure 14:
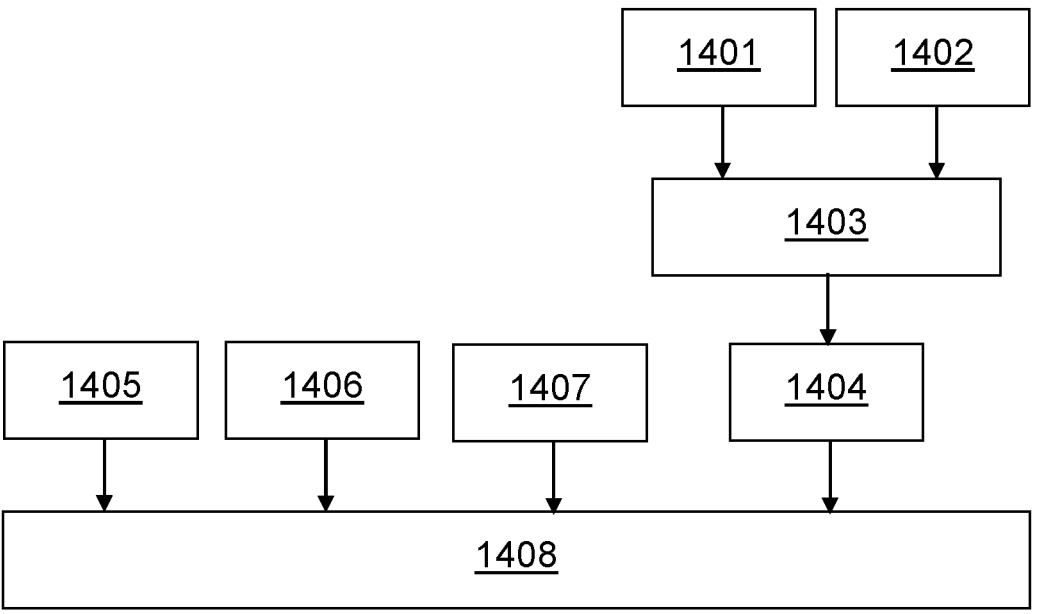
FIG. 14 shows an embodiment example of a method for manufacturing a vehicle headlight according to FIG. 11.

FIG. 14 shows, in conjunction with FIGS. 10, 11, 12 and 13, an example of an embodiment for manufacturing (stacking) a lighting module 5B. Here, the objective lens 42 is press-molded in a step 1405 with a mark of its orientation. In addition, the objective lens 43 is press-molded in a step 1406 with a mark to its orientation, and the objective lens 44 is press-molded in a step 1407 with a mark to its orientation.

Reference numeral 1401 denotes a step in which the lens body 460 is press-molded with a mark for aligning the lens body 460. Reference numeral 1402 denotes a step in which the lighting matrix 4611 is deposited on the carrier 4612 to implement a lighting assembly 461. Steps 1401 and 1402 are followed by a step 1403 in which the carrier 4612 or the lighting assembly 461 is connected to the lens body 460 to form the lighting lens 46 or 46'. The step 1403 is followed by a step 1404 in which the recess 468 of the lens body 460 is provided with a dust filter 469. Steps 1405, 1406, 1407 and 1404 are followed by a step 1408 in which the objective lenses 42, 43 and 44 together with an aperture having an opening 41 and the lighting lens 46 or 46' aligned with each other by means of the markings are assembled. This is done for example by means of a gripper not shown. Subsequently, the lighting module 5B and the control 3 are integrated into a housing to form a vehicle headlight 10. Equipping the lighting module 5B with a heat sink can be carried out, for example, as part of step 1403, as part of step 1404 or as part of step 1408.

The elements in the figures are drawn with simplicity and clarity in mind, and not necessarily to scale. For example, the scales of some elements are exaggerated relative to other elements to enhance understanding of embodiments of the present disclosure.

The disclosure provides a motor vehicle headlight with improvements. It is desirable to avoid the aforementioned increase in effort and cost or to reduced effort and cost for implementing matrix light or adaptive high beam. In this context or for an aforementioned system comprising segmented light sources and an objective, a particular imaging quality is provided.

LIST OF REFERENCE SIGNS 1 motor vehicle
2 environment sensor technology
3 control
5, 5A, 5B lighting module
10 vehicle headlight
31, 41 opening of an aperture
32, 33, 34,
35, 42, 43,
44, 51, 52 objective lens
36, 46, 53 lighting lens
463 support shoulder
464, 464' air gap
465 centering surface
466, 466' lens edge
4611, 4611' lighting matrix
4612, 4612' carrier
467 seal
468 recess
469 dust filter element
50, 50A, 50B objective
511, 521, 531 convex curved surface
512, 522 planar surface

516, 526 lens edge
533 antireflection coating
534 lighting assembly
535 heatsink
536, 360, 460, 460' lens body
555 optical axis
71-76 step
751-755 step
81 reference area
82 camera
83 database
84 inspection module
1401-1408 step
D, d1, d2 distance
L5 illumination pattern
L51 dazzleed areas
L52 dimmed areas
L53 curve light

The invention claimed is:

1. A motor vehicle headlight comprising a lighting lens, the lighting lens comprising:

a lens body made of transparent material, the lens body comprising at least one light entrance surface and at least one light exit surface;

a lighting assembly which comprises a carrier and a lighting matrix arranged on the carrier, the lighting matrix having a plurality of independently controllable lighting pixels, the lighting matrix being configured for irradiating light into the entrance surface of the lens body, which light exits from the light exit surface of the lens body, wherein an air gap is provided between the lighting matrix and the light entrance surface of the lens body, the air gap being sealed dust-tight but not air-tight; and an objective configured for imaging light emitted by the lighting matrix, wherein the objective comprises the lens body, at least a first objective lens, and at least a second objective lens.

2. The vehicle headlight of claim 1, wherein the air gap is sealed dust-tight but not air-tight with respect to the surroundings of the lighting lens by a dust filter element.

3. The vehicle headlight of claim 1, wherein the air gap is sealed dust-tight but not air-tight with respect to the surroundings of the lighting lens by a membrane.

4. The vehicle headlight of claim 3, wherein the lighting matrix comprises not less than 10,000 independently controllable lighting pixels.

5. The vehicle headlight of claim 1, wherein the lighting matrix comprises not less than 10,000 independently controllable lighting pixels.

6. A vehicle headlight having a lighting lens, the lighting lens comprising:

a lens body made of transparent material, the lens body comprising at least one light entrance surface and at least one light exit surface;

a lighting assembly which comprises a carrier and a lighting matrix arranged on the carrier, the lighting matrix having a plurality of independently controllable lighting pixels, the lighting matrix being configured for irradiating light into the entrance surface of the lens body, which light exits from the light exit surface of the lens body, wherein an air gap is provided between the lighting matrix and the light entrance surface of the lens body, the air gap being sealed dust-tight but not air-tight; and wherein the lens body comprises a lens edge, wherein a first distance along an optical axis of the lighting lens denoting the extension of the lens edge of the lens body is not subject to tolerance.

7. The vehicle headlight of claim 6, wherein the air gap is sealed dust-tight but not airtight with respect to the surroundings of the lighting lens by a dust filter element.

8. The vehicle headlight of claim 6, wherein the air gap is sealed dust-tight but not airtight with respect to the surroundings of the lighting lens by a membrane.

9. The vehicle headlight of claim 8, wherein the lighting matrix comprises not less than 10,000 independently controllable lighting pixels.

10. The vehicle headlight of claim 6, wherein the lighting matrix comprises not less than 10,000 independently controllable lighting pixels.

11. The vehicle headlight of claim 6 further comprising:

a first objective lens; and at least a second objective lens, wherein the first objective lens, the second objective lens and the lens body are arranged to provide for an objective for imaging light emitted by the lighting matrix.

12. The vehicle headlight of claim 6 further comprising:

an objective configured for imaging light emitted by the lighting matrix, wherein the objective comprises the lens body and at least a first objective lens.

13. The vehicle headlight of claim 6 further comprising:

an objective configured for imaging light emitted by the lighting matrix, wherein the objective comprises the lens body, at least a first objective lens, and at least a second objective lens.

14. The vehicle headlight of claim 13, wherein the first objective lens comprises a first light entrance surface and a first light exit surface, wherein the second objective lens comprises a second light entrance surface and a second light exit surface, wherein the first light entrance surface is configured as a planar surface, wherein the first light exit surface is configured as a convexly curved surface, wherein the second light entrance surface is configured as a convexly curved surface, and wherein the second light exit surface is configured as a planar surface.

15. The vehicle headlight of claim 14, wherein the first objective lens has a light exit surface that forms a light exit surface of the objective.

16. The vehicle headlight of claim 6, wherein a second distance between the light entrance surface and the light exit surface has a tolerance.

17. The vehicle headlight of claim 6, wherein the carrier is in contact with the lens edge.

18. The vehicle headlight of claim 17, wherein the light exit surface is curved concavely.

19. The vehicle headlight of claim 8, wherein the lens body is press-molded from a blank, the lens body comprising a lens edge, wherein a first distance along an optical axis of the lighting lens denoting the extension of the lens edge of the lens body is not subject to tolerance, wherein a second distance between the light entrance surface and the light exit surface has a tolerance due to variations in volume of a corresponding blank for press-molding the lens body.

20. A vehicle headlight having a lighting lens, the lighting lens comprising:

a lens body made of transparent material, the lens body comprising at least one light entrance surface and at least one light exit surface;

a lighting assembly which comprises a carrier and a lighting matrix arranged on the carrier, the lighting matrix having a plurality of independently controllable lighting pixels, the lighting matrix being configured for irradiating light into the entrance surface of the lens body, which light exits from the light exit surface of the lens body, wherein an air gap is provided between the lighting matrix and the light entrance surface of the lens body, the air gap being sealed dust-tight but not air-tight; and wherein the lens body is press-molded from a blank, the lens body comprising a lens edge, wherein a first distance along an optical axis of the lighting lens denoting the extension of the lens edge of the lens body is not subject to tolerance, wherein a second distance between the light entrance surface and the light exit surface has a tolerance due to variations in volume of a corresponding blank for press-molding the lens body.

21. The vehicle headlight of claim 20 further comprising:

an objective configured for imaging light emitted by the lighting matrix, wherein the objective comprises the lens body, at least a first objective lens, and at least a second objective lens.

22. The vehicle headlight of claim 21, wherein the carrier is in contact with the lens edge.

23. The vehicle headlight of claim 22, wherein the light exit surface is curved concavely.

* * * * *